C. A. BROCK.
JACK.
APPLICATION FILED JULY 18, 1916.
1,235,105.
Patented July 31, 1917.
2 SHEETS—SHEET 1.
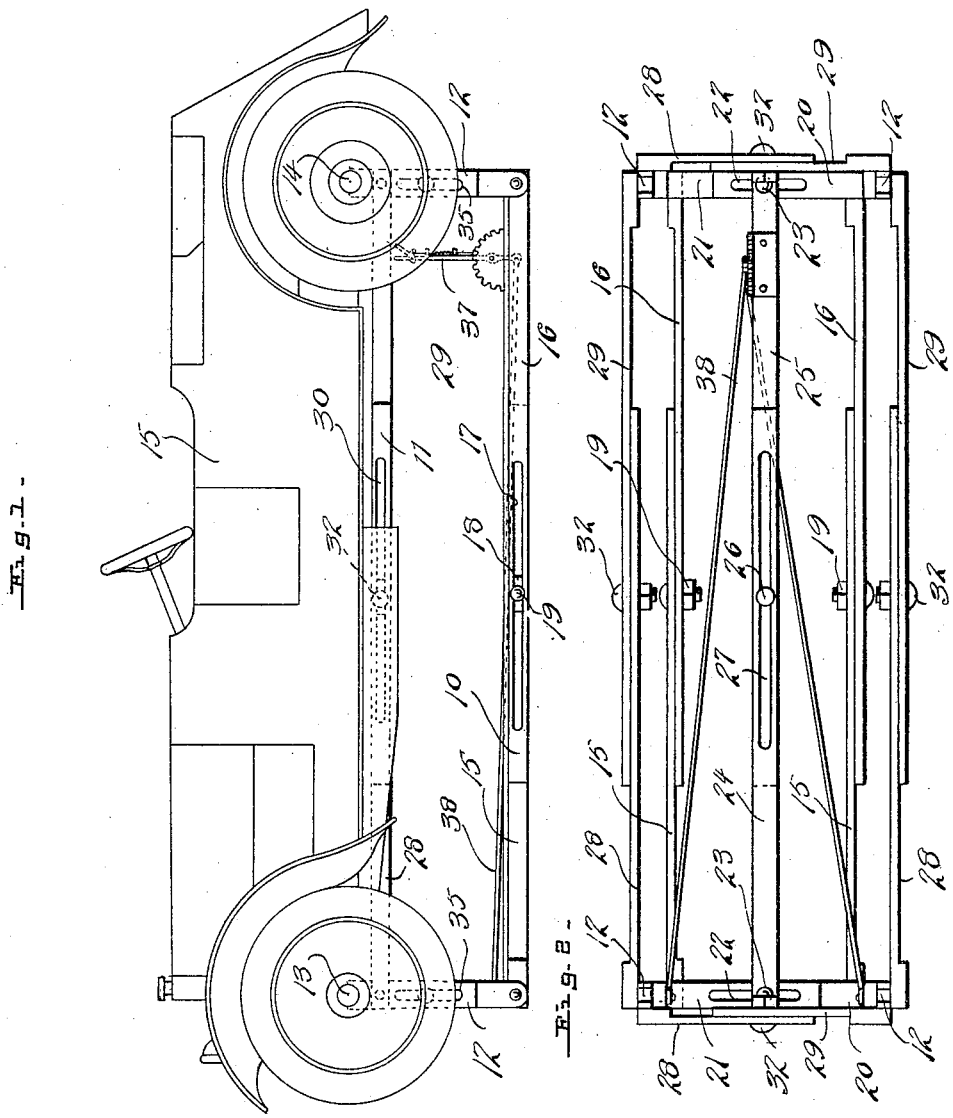
WITNESSES
INVENTOR
Chester A. Brock.
BY
ATTORNEY C. A. BROCK.
JACK.
APPLICATION FILED JULY 18, 1916.
1,235,105.
Patented July 31, 1917.
2 SHEETS—SHEET 2.
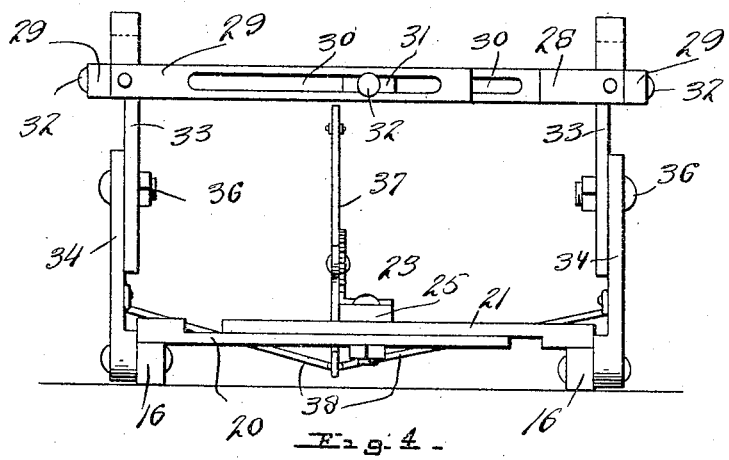
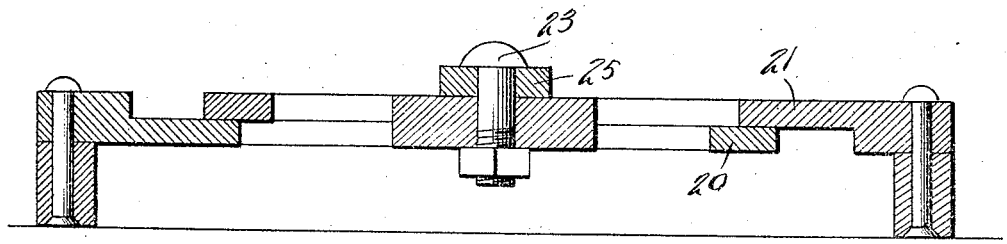
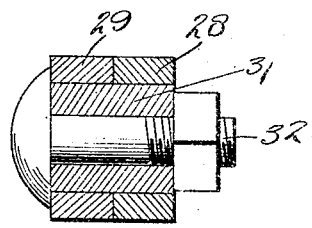
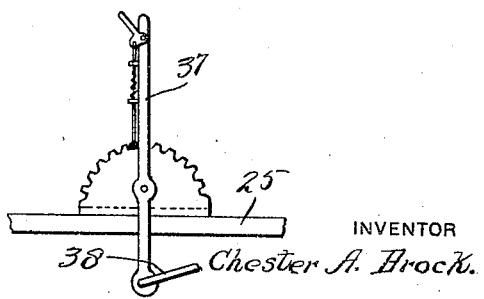
WITNESSES
INVENTOR
Chester A. Brock.
BY
ATTORNEY

UNITED STATES PATENT OFFICE.

CHESTER A. BROCK, OF CHAMBERLAIN, SOUTH DAKOTA.

JACK.

1,235,105.          Specification of Letters Patent.      Patented July 31, 1917.

Application filed July 18, 1916. Serial No. 109,949.

*To all whom it may concern:*

Be it known that I, CHESTER A. BROCK, a citizen of the United States, residing at Chamberlain, in the county of Brule and State of South Dakota, have invented certain new and useful Improvements in Jacks, of which the following is a specification.

This invention relates to an improved automobile jack and the principal object of the invention is to provide a jack which can be used for raising an automobile from the ground thus relieving the tires from unnecessary strain and pressure when the machine is not in use, the jack being so constructed that it may be adjusted according to the length and width of the automobile.

Another object of the invention is to so construct this jack that while it may be adjusted it may be securely held in the adjusted position thus providing a very strong and durable jack which will not be liable to collapse.

Another object of the invention is to so construct the jack that it may be moved to a raised position from one end of the automobile and to further so construct it that the automobile may be raised above the ground the desired distance.

This invention is illustrated in the accompanying drawings, wherein:—

Figure 1 is a view in side elevation showing the jack in use with the automobile raised from the ground.

Fig. 2 is a top plan view of the improved jack,

Fig. 3 is an end elevation of the improved jack.

Fig. 4 is a longitudinal sectional view through the end portion of the lower frame of the jack.

Fig. 5 is a sectional view through one of the end bars of the upper frame of the jack to show the manner of securely holding the end sections thereof in the adjusted position.

Fig. 6 is a fragmentary view in elevation showing the manner of mounting the latch lever forming part of the jack.

This jack is provided with a lower frame indicated in general by the numeral 10 in Fig. 1 and an upper frame indicated in general by the numeral 11 in Fig. 1, the upper and lower frames being connected by standards 12 which engage the axles 13 and 14 of the automobile 15 and raise the automobile when swung upwardly so that the automobile will be suspended from the ground.

The lower frame is provided with side bars having end sections 15 and 16 which extend in overlapping relation and are provided with slots 17 in which are positioned blocks 18 through which pass bolts 19. When these bolts 19 are loosened, the end sections of the side bars can be moved longitudinally until the lower frame is the proper length and the bolts can then be tightened and will engage the end sections thus securely clamping them and retaining the lower frame at the desired length. The end bars of the lower frame are also provided with end sections 20 and 21 which are rigidly secured to the end sections of the side bars and are provided with slots 22 through which pass securing bolts 23. These bolts 23 also pass through the longitudinally extending center bar or bracing bar which must of course be also formed in two end sections 24 and 25 held in the adjusted position by the bolt 26 which passes through the slot 27.

The upper frame 11 is also provided with side bars and end bars, each of which is provided with end sections 28 and 29 having registering slots 30 formed therein. Blocks 31 are mounted in these slots 30 and carry securing bolts 32 which when tightened will securely clamp the sections 28 and 29. The standards 12 are also formed in sections, the upper section being designated by the numeral 33 and the lower by the numeral 34. These standard sections are provided with slots 35 similar to the slots of the side and end bars of the upper and lower frames and securing bolts 36 will be passed through these registering slots 35 thus permitting the standards to be raised the proper amount and securely held at the proper height.

It will thus be seen that when the device is in use, it can be adjusted for the length and width of the automobile and also according to the height it is desired to raise the machine from the ground and can then be placed upon the floor beneath the automobile. The axles 13 and 14 will fit into the seats formed in the upper ends of the standards and when the standards are swung upwardly, through the medium of the latch lever 37 and yoke 38, connected with the lower end of the latch lever, the automobile will be swung free from the ground and will be suspended in the raised position. Of course, if desired the jack could be firmly secured to the floor of the garage in any suitable manner after it had been adjusted according to the size of the machine with which it was to be used and this would make the operation of the device easier as it would be solidly connected with the floor and therefore could not possibly move when the lever is drawn to raise the standards. When no longer in use, the jack could be easily taken to pieces by simply removing the securing bolts and therefore it could be stored in a comparatively small amount of space or easily transported from one place to another. It will be further obvious that if desired, the slotted portions of the bars could be provided with gripping teeth which would interlock when the securing bolts are tightened thereby making the connections stronger and preventing any possibility of the parts slipping from the adjusted position.

What is claimed is:—

A lifting jack of the character described comprising a lower frame, an upper frame, standards connecting said upper and lower frames, said standards and upper and lower frames being formed of bars extending in overlapping relation and provided with registering slots, blocks positioned in said slots, securing bolts passing through said slots and engaging the bars to hold the bars in an adjusted position, a yoke having its arms connected with the standards at one end of said jack, and means for moving said yoke to swing said standards upwardly and raise the upper frame of the jack and releasably hold the jack in a raised position.

In testimony whereof I affix my signature in presence of two witnesses.

CHESTER A. BROCK.

Witnesses:
VERA L. PARK,
M. A. BROWN.

Copies of this patent may be obtained for five cents each, by addressing the "Commissioner of Patents, Washington, D. C."